United States Patent [19]

Ingram

[11] 4,241,860
[45] Dec. 30, 1980

[54] ARTICLE CARRIER STANCHION

[75] Inventor: Charles E. Ingram, Warren, Mich.

[73] Assignee: Four Star Corporation, Troy, Mich.

[21] Appl. No.: 22,060

[22] Filed: Mar. 19, 1979

[51] Int. Cl.³ .............................................. B62D 33/00
[52] U.S. Cl. ..................................... 224/316; 224/326
[58] Field of Search .............. 224/316, 309, 325, 326; 296/137 J, 324, 326, 321

[56] References Cited

U.S. PATENT DOCUMENTS

| 3,120,914 | 2/1964 | Smith | 224/326 |
| 3,330,454 | 7/1967 | Bott | 224/326 X |
| 3,519,180 | 7/1970 | Bott | 224/321 |
| 3,951,320 | 4/1976 | Bott | 224/326 |
| 4,155,585 | 5/1979 | Bott | 224/324 X |

Primary Examiner—Steven M. Pollard
Attorney, Agent, or Firm—Reising, Ethington, Barnard, Perry & Brooks

[57] ABSTRACT

A stanchion for mounting a luggage rack or the like to a surface of a vehicle is disclosed. The stanchion is mounted to a surface of the vehicle and supports along its upper surface a side rail extending forward and a deflector blade support rail which extends rearwardly therefrom. The deflector blade support mounts a transverse deflector blade which may be fixedly attached or pivotally attached thereto.

1 Claim, 5 Drawing Figures

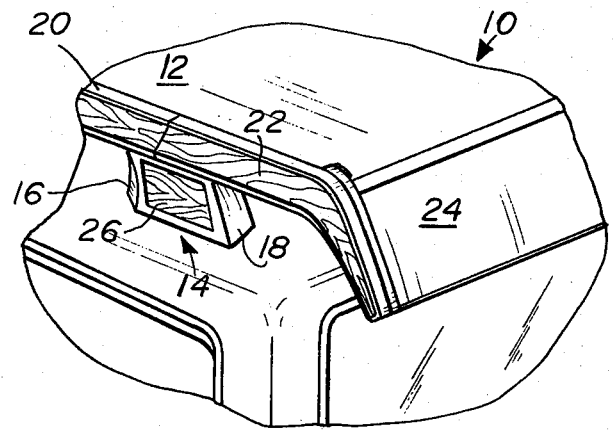
*FIG-1*
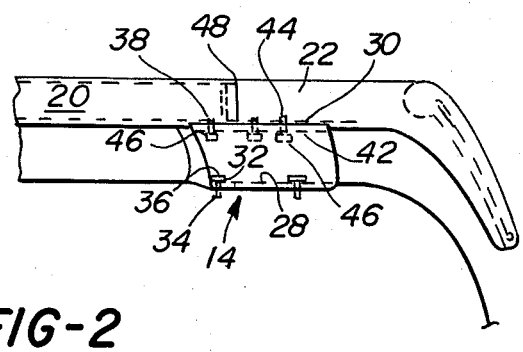
*FIG-5*
*FIG-2*
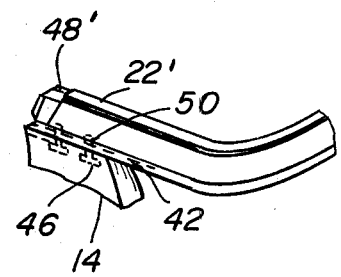
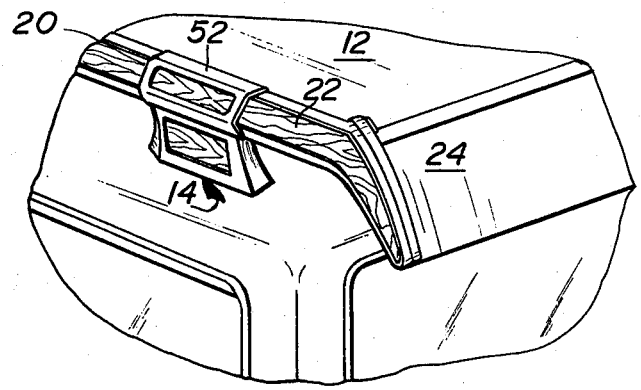
*FIG-3*
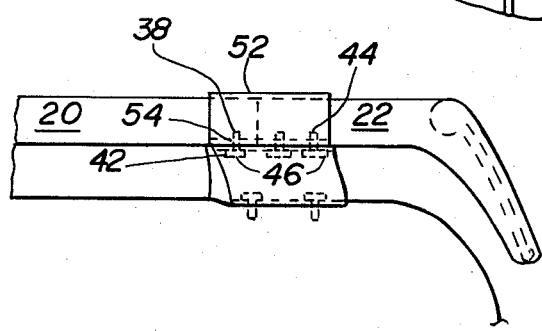
*FIG-4*

ARTICLE CARRIER STANCHION

BACKGROUND OF THE INVENTION

I. Field of the Invention

The present invention pertains to luggage rack stanchions. More particularly the present invention pertains to vehicle mounted article carrier stanchions. Even more particularly the present invention concerns vehicle mounted article carrier stanchions for mounting a luggage rack side rail and a transverse deflector blade support.

II. Prior Art

In U.S. application Ser. No. 848,402 filed Nov. 4, 1977 entitled "VELOCITY SENSITIVE AIR DEFLECTOR", there is disclosed therein a vehicle related air deflector blade which is movable between a vertical and horizontal position, including a deflector blade support.

In U.S. Pat. Nos. Re. 26,538; Re. 26, 539; and Re. 29,348 there is disclosed a stanchion for supporting a side rail and a deflector blade support which is rail supported. None of the above disclosures describe a stanchion supported deflector blade support.

III. Statement of the Relevant Art

To the best of the applicant's knowledge is the most relevant art is that found in the aforementioned United States patent applications as well as patents recited therewithin.

SUMMARY OF THE INVENTION

In accordance with the present invention there is provided a stanchion having a bottom wall conforming to the surface to which it is mounted; a top wall approximately parallel to and spaced above the bottom wall; upstanding front and rear walls interconnecting the top and bottom walls, and a longitudinal side wall integral with the bottom wall and the top wall and side walls. A plurality of apertures through the bottom wall are aligned with a plurality of threaded apertures in the surface to which the stanchion is mounted. A plurality of threaded fasteners pass through the apertures in the bottom wall to threadingly engage the apertures in the mounting surface and securely fasten the stanchion to the vehicle.

The upper surface of the top wall of the stanchion conforms to the shape of a bottom wall of a longitudinally extending side rail. The side rail rests upon the top wall which supports the rail along the forward portion thereof spaced from the vehicle roof. One or more apertures through the top wall align with one or more threaded apertures in the rail. One or more threaded fasteners pass through the apertures in the top wall to engage the threaded apertures in the rail and securely hold the rail to the stanchion.

A deflector blade support rail has a cross section conforming to a cross section of the side rail and is placed in abutment with a rear end of the rail along a rear portion of the top wall. The support rail extends rearwardly a distance and then curves downward in an arcuate manner continuing downward and rearward a distance to form an end support for a transverse deflector blade. A second group of one or more apertures through the upper wall align with a second group of threaded apertures in the support. A corresponding group of threaded fasteners pass through the second aperture to engage the threaded apertures in the support and provide a streamlined abutment of the support to the rail and secure the support to the stanchion.

Other advantages and applications of the present invention will become apparent to those skilled in the field to which this invention pertains when the accompanying description of the best modes contemplated for practicing the invention are read in conjunction with the accompanying drawings. For a more complete understanding of the present invention reference is made to the following detailed description and accompanying drawings. In the drawings, like reference characters refer to like parts throughout the several views in which:

BRIEF DESCRIPTION OF THE DRAWINGS

FIG. 1 is a broken perspective view of a stanchion supporting a side rail and deflector blade support rail in accordance with the present invention;

FIG. 2 is a side view of the stanchion, side rail, and deflector blade support of FIG. 1;

FIG. 3 is a broken perspective view of a second embodiment of a stanchion, side rail, and deflector blade support in accordance with the present invention;

FIG. 4 is a side view of the stanchion, side rail, and deflector blade support of FIG. 3 and FIG. 5 is a broken perspective view of a cross-rail used in conjunction with the present invention.

DESCRIPTION OF THE PREFERRED EMBODIMENT

As shown in FIGS. 1-5, in accordance with the present invention there is provided a vehicle luggage rack device generally indicated at 10. The luggage rack device hereof rests upon a vehicle rool 12 which includes an upright stanchion 14.

At the outset it is to be noted that the stanchion 14 is normally mounted onto the roof 12 of a vehicle. However, the stanchion 14 can be mounted to a vehicle deck, roof, or any other suitable vehicle surface. It should be appreciated that herein and in the appended claims, the term "luggage rack" contemplates a luggage rack, ski rack, bicycle rack or similar related vehicle associated device. As is known to those skilled in the art, such devices comprise a plurality of spaced apart slats along the vehicle surface which support a load or article disposed thereon. Such devices incorporate side rails and stationary or movable cross rails where appropriate, and, stanchions are employed to support the side rails and cross rails. It is to be understood that the stanchion of the present invention is applicable to all such article carriers.

The stanchion 14 comprises a bottom wall 28 of planar configuration shaped to conform to the surface to which it is mounted, a front wall 16 integral with the bottom wall 28 extends between the bottom wall 28 and a top wall 30 and is integral therewith. A rear wall 18 extends vertically between the bottom wall 28 and the top wall 30 and is integral therewith. A side wall 26 joins the top wall 30, the bottom wall 28, the front wall 16 to form an integral structure. The bottom wall 28 has one or more apertures 32 aligned one or more apertures 34 in the vehicle roof. A corresponding number of fasteners 36 pass through the apertures 32 and engage the threaded apertures 34 to securely fasten the stanchion 14 to the vehicle roof. Preferably, the apertures 32 and the fasteners are threaded.

In accordance with the present invention, the stanchion 14 supports a longitudinal side rail 20 along the top wall 30, the rail 20 extends longitudinally forward from a forward portion of the stanchion top wall 30. A deflector blade support rail 22 is supported along the rear portion of the top wall 30 of the stanchion 14 extending longitudinally rearward.

The side rail 20 overlays a forward portion of the stanchion 14 and extends longitudinally forward therefrom. The outer surface of the top wall 30 conforms to a bottom surface of the rail 20 to snugly abut the rail to the stanchion. At least one, and preferably a plurality of apertures 42 are formed through the top wall 30 and align with a plurality of apertures 38 formed in the rail 20. A plurality of threaded fasteners 46 one for each aligning pair of apertures pass through the apertures 42. The fasteners engage the apertures 38 to securely hold the rail 20 to the stanchion 14, preferably, the fasteners are threaded fasteners which threadingly engage the apertures 42, 38.

A deflector blade support 22 has its forward end abutting the rail 20 and a bottom wall of the deflector blade support 22 overlays and conforms with a rearward portion of the top wall of the stanchion 14. A cross-section of the support 22 conforms with the cross-section of the rail where they abut. One or more apertures 42 through the top wall 30 are aligned with one or more apertures 44 in the deflector blade support 22. One or more fasteners 46 pass through the apertures 42 and engage the apertures 44 to securely hold the deflector blade support in abutment with the top wall of the stanchion 14 and the rail 20. Preferably the apertures 44 and the fasteners 46 are threaded. A projection 48 at the forward end of the deflector blade support 22 nestingly engages a recess at the rear end of the side rail 20. When the side rail and the deflector blade support 22 are in abutment, the projection 48 aligns the end of the rail 20 with the end of the support 22 to produce a streamlined surface where the rail and support joins. The deflector blade support extends rearward a distance beyond the stanchion and then curves downward in an arcuate manner then continues downward and rearward a distance to form an end support for the deflector blade 24.

A pair of spaced apart deflector blade supports 22 are disposed along opposite edges of the vehicle roof 12 near the rear of the vehicle and support therebetween a stationary or pivotable transverse deflector blade 24.

As is known to the skilled artisan, a pivoting deflector blade comprises a light weight member of any suitable configuration journaled between the deflector blade supports and which by its weight distribution orients angularly with the roof in response to the air velocity flowing therepast. The transverse deflector blade 24 is supported between a pair of spaced apart supports. A pair of pivots are attached to the deflector blade supports at the upper part of the downward and rearward extending portion thereof. The other end of the pivot is pivotally attached to the ends of the deflector blade 24 near the forward edge thereof. The pivots allow the deflector blade to assume a nearly vertical position when the vehicle is at rest and a nearly horizontal position when the vehicle is moving at high speed with considerable wind blowing therepast in a manner described more completely in U.S. patent application Ser. No. 848,402.

Referring now to FIG. 3 wherein there is illustrated a second embodiment of the present invention. A tubular member 52, is disposed atop the upper wall of the bracket 14, and has an inside dimension configured to snugly receive the outer dimension of the side rail 20 within its forward portion. The rearward portion of the tube 52 snugly receives the forward portion of the deflector blade support 22. When the deflector blade support 22 is inserted into the tube 52 and is in abutment with the rear end of the side rail 20, the deflector blade support 22 and the rail 20 are supported within the tube 52. A corresponding number of apertures 54 through a wall of the tube 52 align with the apertures 42 in the stanchion 14. A corresponding number of apertures 38 in the rail and apertures 44 in the deflector blade support 22 align with the apertures 42 and 54. A plurality of fasteners 46 engage the apertures 38 and 44 to securely fasten the tube 52, the rail 20, and the deflector blade support 22 to the stanchion 14. Preferably, the apertures 38 and 44 and the fasteners 46 are threaded.

Referring now to FIG. 5 wherein there is depicted a crossrail 22' which alternately can be mounted on the stanchion 14 in place of the deflector blade support 22. The cross rail 22' comprises a longitudinal section which overlays the top wall 30 and has a projection 48' which telescopingly engages the recess in the longitudinal rail 20 when the forward end of the transverse rail 22' is in abutment with the side rail 20. The cross-rail 22' extends rearward a distance then curves toward the center of the vehicle in an arcuate manner. The cross-rail 22' extends transversely across the vehicle and then curves forward in an arcuate manner to align with and rest upon the top of an oppositely disposed stanchion 14 on the opposite side of the vehicle. One or more threaded apertures 50 are aligned with one or more apertures 42 in the stanchion and corresponding number of threaded fasteners 46 pass through the apertures 50 in the cross-rail engaging the threaded apertures 50 to secure the cross-rail 22' to the stanchion 14.

The tubular member 52 can alternately be used to mount the cross-rail 22' to the stanchion in the manner described hereinabove.

It is to be appreciated from the foregoing disclosure that there has been described herein a luggage rack device for attaching a luggage rack to a vehicle surface.

Having thus described the invention, what is claimed is:

1. A vehicle article carrier device comprising:
    an upright stanchion having a longitudinally disposed planar bottom wall conforming to a vehicle surface on which the carrier is mounted,
    an upstanding side wall integral with the bottom wall,
    a pair of end walls integral with the bottom and side walls,
    an enlarged top wall integral with the side wall and the end walls,
    the lengths of the bottom wall, the top wall and the side wall being generally equal,
    the height of said end walls being less than the length of said top wall;
    fastener means coacting with the bottom wall for attaching said stanchion to the vehicle surface;
    a longitudinally extending side rail having one end supported upon the top wall of the stanchion, said one end terminating intermediate the stanchion end walls;
    fastener means for attaching the side rail to the stanchion top wall;
    an air deflector blade disposed transversely of said side rail;
    a deflector blade support arm having
        a longitudinal section aligned with and having the cross-sectional shape of said side rail, said longitudinal section including one end supported on the top wall of the stanchion, said one end terminating intermediate the stanchion end walls and in abutment with the one end of said side rail, said support arm terminating in an integral end portion depending from the longitudinal section, the length of said end portion being substantially equal to the height of the deflector blade;

fastener means for attaching the deflector blade support arm to the stanchion top wall; and means for pivotally connecting the deflector blade to said support arm at the junction of the longitudinal section and the depending end portion whereby said blade may pivot relative to said support arm.

* * * * *

UNITED STATES PATENT AND TRADEMARK OFFICE
CERTIFICATE OF CORRECTION

PATENT NO.  : 4,241,860
DATED       : December 30, 1980
INVENTOR(S) : Charles E. Ingram It is certified that error appears in the above—identified patent and that said Letters Patent is hereby corrected as shown below:

Column 2, line 34, "rool" should be -- roof --.

Column 2, line 61, after "aligned" insert -- with --.

Column 4, line 50, "enlarged" should be -- elongated --.

Signed and Sealed this

Twenty-first Day of April 1981

[SEAL]

Attest:

RENE D. TEGTMEYER

Attesting Officer    Acting Commissioner of Patents and Trademarks